United States Patent

[11] 3,632,166

| [72] | Inventor | Thomas E. Lohr<br>Warren, Mich. |
|---|---|---|
| [21] | Appl. No. | 833,370 |
| [22] | Filed | June 16, 1969 |
| [45] | Patented | Jan. 4, 1972 |
| [73] | Assignee | Allied Chemical Corporation<br>New York, N.Y. |

[54] VEHICLE SEAT HAVING COMBINED CONTOUR AND TILT ADJUSTMENT
5 Claims, 3 Drawing Figs.

[52] U.S. Cl. .................................................. 297/284,
297/344, 297/367
[51] Int. Cl. ....................................................... A47c 3/00,
A47c 1/02, A47c 15/00
[50] Field of Search............................................. 287/284,
325–329, 344–312, 70, 71, 88, 423, 425

[56] References Cited
UNITED STATES PATENTS

| 2,313,023 | 3/1943 | Ruegger ...................... | 297/344 X |
| 2,798,534 | 7/1957 | Curtis.......................... | 297/88 X |
| 3,087,757 | 4/1963 | Fidel ........................... | 297/434 |
| 3,101,216 | 8/1963 | Schliephacke ............... | 297/88 |
| 3,167,351 | 1/1965 | Butler.......................... | 297/423 |

FOREIGN PATENTS

| 647,598 | 6/1937 | Germany...................... | 297/367 |
| 1,243,623 | 9/1960 | France ......................... | 297/88 |

Primary Examiner—Paul R. Gilliam
Attorneys—Marvin Bressler and Jonathan Plant

ABSTRACT: A vehicle seat assembly including a base portion adapted to be secured to a supporting surface in fixed relationship therewith with a seat mounted on the base portion for fore and aft tilting movement with respect to the base portion and means for locking the seat relative to the base portion in a selected position. The seat has a movable leg rest or thigh supporting section which is adjustable to selectively change the contour of the seat to obtain a desired relationship between the contour of the seat and the tilted position of the seat with respect to the base portion.

PATENTED JAN 4 1972     4,632,166
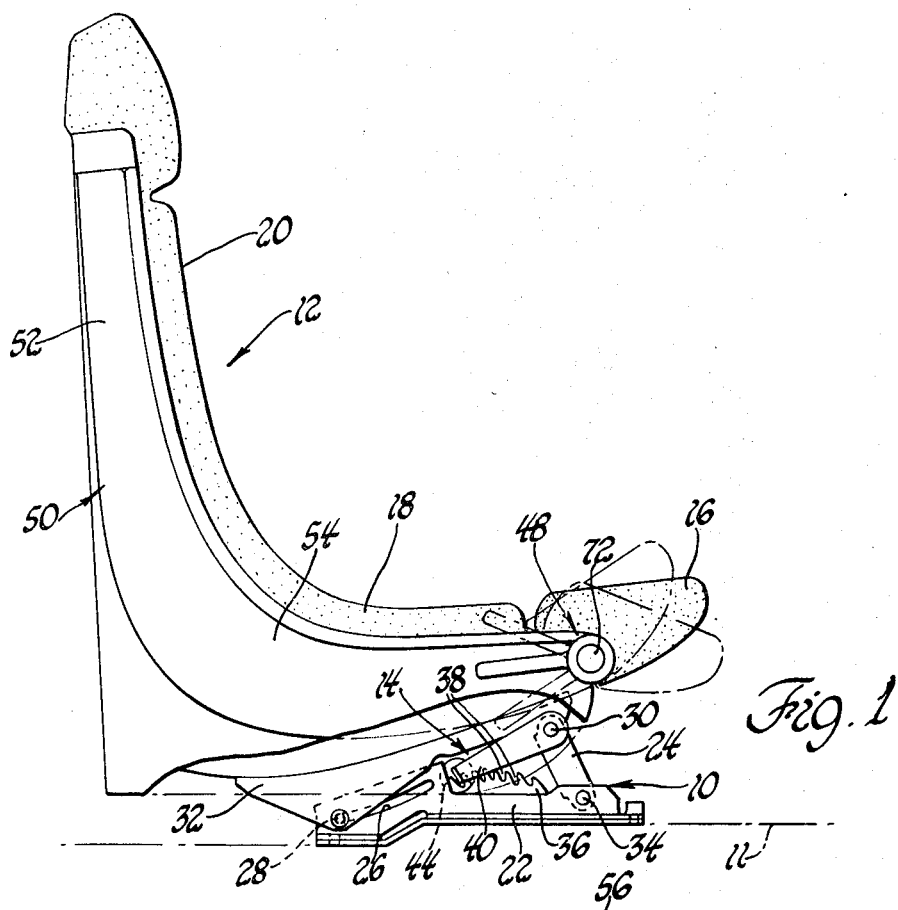
Fig. 1
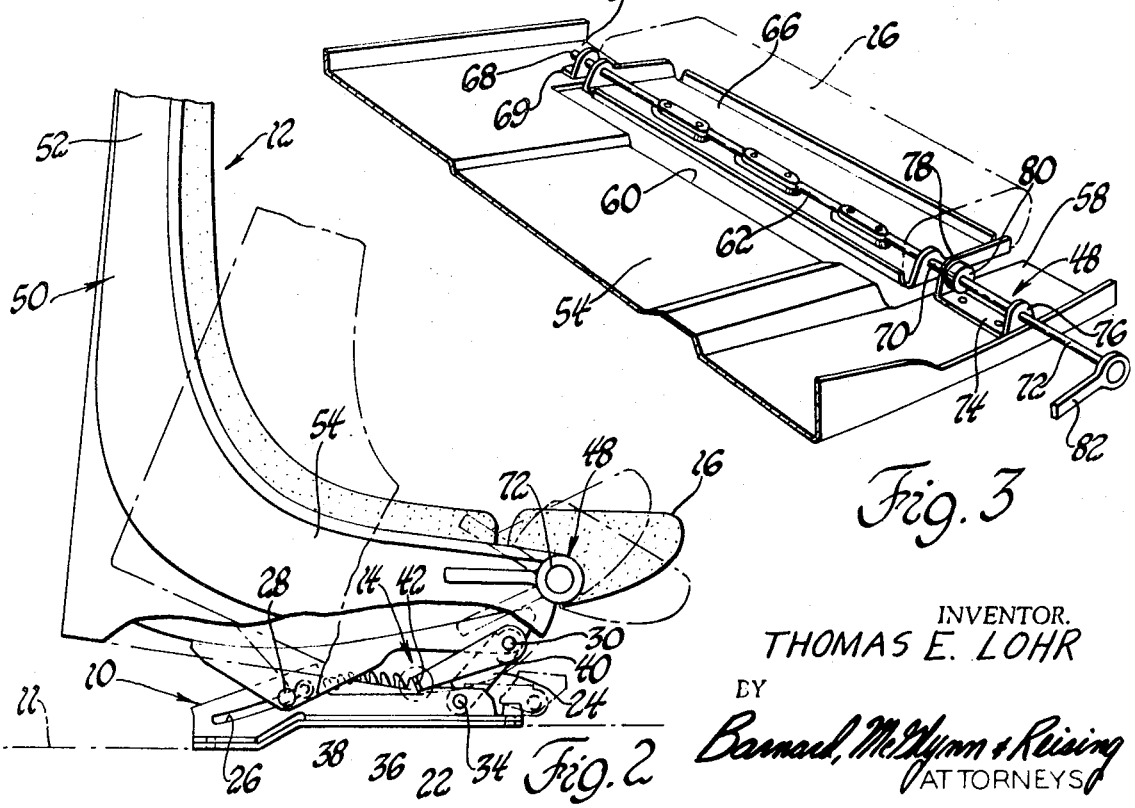
Fig. 2
Fig. 3
INVENTOR.
THOMAS E. LOHR
BY
Barnard, McGlynn & Reising
ATTORNEYS

VEHICLE SEAT HAVING COMBINED CONTOUR AND TILT ADJUSTMENT

This invention relates generally to vehicle seats and is particularly concerned with a vehicle seat that can be tiltably adjusted with respect to its supporting surface and can at the same time have its seating contour adjusted to obtain the most comfortable relationship between the contour of the seat and the tilted position of the seat for the occupant.

Seats for automobiles must accommodate persons of different sizes and shapes. Furthermore, during prolonged driving periods, the occupant of the seat is subject to fatigue and discomfort which can sometimes be at least partially relieved by changing the position of the seat and the portions of the seat supporting certain parts of the body. The seat for the driver of an automobile must provide a reasonable amount of comfort to the driver and must also be positioned to provide the driver with maximum access to the controls of the vehicle. The position of the driver's seat relative to the controls must be adjustable to accommodate persons of different size. The tilt angle of a seat relative to the vehicle floor that is comfortable under one set of conditions, or for one particular occupant, may be uncomfortable under another set of conditions or for a different occupant. Moreover, the contour of the seat that is comfortable for one particular occupant, or in a particular set of conditions, may be uncomfortable for a different occupant or under a different set of conditions.

It is therefore an object of this invention to provide a vehicle seat assembly wherein the seat is tiltably adjustable in a fore and aft direction and includes a movable section adjustable to selectively change the contour of the seat to obtain a desired relationship between the contour of the seat and the position of the seat with respect to the supporting surface.

Another object is to provide a vehicle seat assembly including a bucket-type seat having unitary back and bottom portions mounted for fore and aft tilting adjustment relative to a supporting surface and having a movable leg rest or thigh supporting member mounted on the forward portion of the bottom portion of the seat which is adjustable to vary the contour of the seat to obtain a desired relationship between the contour of the seat and the tilt angle of the seat relative to the supporting surface.

In carrying out the foregoing, and other objects, a vehicle seat assembly according to the present invention includes mounting apparatus having a base portion which is adapted to be secured to an automobile floor or other supporting surface in fixed relationship with respect thereto. A seat is mounted on the base portion for fore and aft tilting movement, and means is provided for locking the seat relative to the base portion in a selected one of a plurality of positions with respect to the base portion. The seat is provided with a movable leg rest or thigh supporting section which is adjustable to selectively change the contour of the seat to obtain a desired relationship between the contour of the seat and the tilted position of the seat with respect to the base portion. Consequently, the occupant of the seat can tilt the seat in a fore and aft direction to a desired position and at the same time can adjust the contour of the seat to obtain a comfortable relationship between the tilt angle and the contour of the seat.

The seat includes unitary back and bottom portions, and the movable section is mounted along the forward edge of the bottom portion and defines an adjustable extension thereof for supporting the upper legs or thighs of the occupant. The movable section is preferably pivotally mounted on the bottom portion for selective adjustment about its pivotal axis with respect to the bottom portion to change the contour of the seat.

The seat is secured to the base portion by attachment means which provides fore and aft movement between the seat and the base portion between an extreme rearward position and an extreme forward position in a path such that the seat tilts progressively forwardly as it moves forwardly from the extreme rearward position.

Other objects, advantages and features of the invention will become apparent from the following description taken in connection with the accompanying drawings in which:

FIG. 1 is an elevational view of a seat assembly embodying the invention with the seat shown in its extreme rearward position and illustrating the range of movement of the adjustable section of the seat;

FIG. 2 is a view similar to FIG. 1 with the seat shown in a forwardly tilted position; and FIG. 3 is a perspective detail view illustrating the mounting of the movable section on the bottom portion of the seat assembly.

In the drawings, FIGS. 1 and 2 illustrate a vehicle seat assembly according to the invention comprising a base portion designated generally by reference numeral 10 which is adapted to be secured to a supporting surface such as the floor of an automobile indicated in phantom lines by reference numeral 11. The base portion is secured in fixed relationship with respect to the supporting surface 11 by fasteners or other conventional means. A seat designated collectively by reference numeral 12 is mounted on the base portion 10 for fore and aft tilting movement with respect to the base portion, and means designated collectively by reference numeral 14 is operable for locking the seat 12 relative to the base portion in a selected position with respect to the base portion. Reference numeral 16 designates a movable section on the seat 12 which is adjustable to selectively change the contour of the seat to obtain a desired relationship between the contour of the seat and the position of the seat with respect to base portion 10.

Seat 12 includes a seating or bottom portion 18 and a back portion 20 which is integral or unitary with the bottom portion 18. The movable section 16 is mounted along the forward edge of the bottom portion 18 and defines an adjustable extension of the bottom portion for supporting the upper legs and thighs of the occupant. As shown more clearly in FIG. 3, the movable section 16 is pivotally mounted on the bottom portion for selective adjustment about its pivotal axis with respect to the bottom portion 18. The specific construction and operation of the adjustable section 16 will be described in detail below.

The seat assembly of FIGS 1 and 2 further includes attachment means securing the seat 12 to the base portion for fore and aft movement with respect to the base portion between an extreme rearward position as shown in FIG. 1 and an extreme forward position as shown in FIG. 2 in a path such that the seat tilts progressively forwardly as it moves forwardly from the extreme rearward position. The attachment means includes a fore and aft extending rail 22 projecting upwardly from the base portion, and a link 24 pivotally connected at its ends between the bottom portion 18 of seat 12 and rail 22. The attachment means further includes means pivotally and slidably connecting the bottom portion with rail 22 in the form of an upwardly and forwardly curved slot 26 formed in the rail 22 and a pin 28 carried by the bottom portion 18 and engaged with slot 26. Link 24 has its upper end pivotally connected at 30 with a bracket member 32 secured to the bottom of the seat portion 18, and its lower end pivotally connected at 34 with the rail 22 adjacent the forward portion thereof. Thus, as the seat 12 moves forwardly from the position shown in FIG. 1 towards the position shown in FIG. 2, pin 28 moves upwardly and forwardly in slot 26, and the pivot point 30 moves in an arc about pivot point 34 such that the pivot point 30 moves upwardly and forwardly until link 24 reaches a vertical position, and thereafter moves downwardly and forwardly.

The looking means 14 for locking the seat 12 relative to the base portion 10 comprises a locking plate 36 mounted on base portion 10 and having a fore and aft extending series of slots 38 formed therein. The slots 38 are engageable by a locking lever 40 which is pivotally mounted on bracket 32 by pivot pin 30. The locking lever 40 has a transversely extending bar or strap 42 which is engageable with a selected one of the slots 38 to restrain the seat 12 against movement with respect to base portion 10. The strap 42 can be selectively engaged and disengaged with one of the slots 38 by pivoting lever 40 about the pivot point 30. An actuating handle 44 projects from lever 40 in the position to be grasped by the occupant of the seat to selectively engage and disengage strap 42 from one of the slots 38. The person occupying the seat can accordingly move the seat between the extreme rearward position shown in FIG. 1 and the position shown in FIG. 2 by disengaging strap 42 from the locking plate 36 until the desired position is reached, whereupon the strap 42 is moved downwardly to engage the selected slot 38 to hold the seat 12 in the selected tilted position with respect to the base portion 10 and floor 11 of the automobile.

As described thus far, the vehicle seat assembly according to the invention comprises seat 12 having unitary back and seat portions 20 and 18, respectively, with mounting means carried by the seat portion including a base member 10 adapted to be secured to the supporting surface 11 in fixed relationship with respect to the supporting surface. The base member 10 is secured to the seat portion 18 such that the seat 12 is tiltable fore and aft with respect to the base member 10, and locking means 14 operable for locking the seat against movement relative to base member 10 from a selected one of a plurality of tilted positions.

The adjustable section 16 is in the form of a leg rest member mounted along the forward edge of bottom portion 18 for movement with respect to the bottom portion 18 to vary the contour of the seat. Reference numeral 48 collectively designates actuating means for adjusting the leg rest member 16 to any selected one of a plurality of positions with respect to the seat portion 18 to selectively adjust the contour of the seat 12 to a desired relationship with its tilted position with respect to the surface 11.

Seat 12 includes a frame 50 of relatively rigid material having a unitary back frame portion 52 and bottom frame portion 54, and the bottom frame portion 54 has a pair of laterally spaced side members 56 and 58 (FIG. 3) projecting forwardly from the front edge 60 of the bottom frame portion. The leg rest member 16 is mounted on the side members 56 and 58 for pivotal movement about a horizontal axis defined by the axis of a rod 62, which axis is parallel with the forward edge 60 of the bottom frame portion 54. The leg rest member 16 includes a frame member 66 nonrotatably secured to rod 62, and rod 62 provides a pair of outwardly projecting pivot arms 68 and 70 each of which is pivotally mounted on one of the side members 56 and 58. Pivot arm 68 is pivotally mounted on side member 56 and pivot arm 70 is pivotally mounted on side member 58. The actuating means 48 includes an actuating shaft 72 rotatably mounted on side member 58 in a bracket member 74 having arms 76 and 78. Actuating shaft 72 is rotatably mounted in arm 76. The actuating shaft 72 is engaged with pivot arm 70 in such a manner to cause rotation of pivot arm 70 only upon rotation of actuating shaft 72 to actuate the leg rest member about the axis of rod 62 to a selected position, and to prevent rotation of pivot arm 70 in response to the application of pressure to the leg rest member 16. The actuating shaft 72 is engaged with pivot arm 70 of rod 62 through an operating mechanism 80 which may be a conventional window regulator mechanism of the type presently used to operate automobile windows. The operating mechanism 80 transmits rotation from actuating shaft 72 to pivot arm 70, but will not transmit rotation from pivot arm 70 to actuating shaft 72. In other words, the leg rest member 16 can be caused to pivot about the axis of rod 62 only by rotation of actuating shaft 72, and pressure on the leg rest member 16 tending to rotate rod 62 will not be effective to do so due to the operator 80. The operating mechanism 80 may function similarly to a worm gear arrangement in which input rotation can only be imparted by the worm, and the worm cannot be caused to rotate by the member with which it is engaged. In the present case, the input rotation to the rod 62 can only be imparted by actuating shaft 72, and the operating mechanism 80 prevents rotation from being transmitted from rod 62 to shaft 72. An actuating handle 82 is fixed to the end of the actuating shaft 72 in such a position that it can be grasped by the person occupying the seat so that merely by turning the handle 82, the occupant can adjust the leg rest member 16 to any position about the axis or rod 62.

When a person enters the vehicle to occupy the seat assembly of FIGS. 1 and 2, he can adjust the seat between the rear and forward extreme positions determined by the position of the rear and forward slot 38 in locking plate 36, or the extreme position shown in FIGS. 1 and 2, to obtain a comfortable tilt angle with the unitary seat construction. At the same time, he can adjust the position of the leg rest member 16 to obtain a comfortable relationship between the position of leg rest member and the tilt angle of the seat.

In the illustrated seat, the unitary frame 50 may be of rigid material to which is secured foam plastic padding or other cushioning material to provide a comfortable body support. By releasing the strap 42 from the forward slot 38, or the position shown in FIG. 2, the seat can be tilted all the way forward as shown in phantom lines such that if the seat 12 is in the front of an automobile, the passengers in the rear can easily enter and leave the vehicle.

While a specific example of the invention has been illustrated and described in the accompanying drawings and foregoing specification, it should be understood that the invention is not limited to the exact construction shown, but that various alternatives in the construction and arrangement of parts will become apparent to those skilled in the art, all of which fall within the scope and spirit of the invention.

The embodiments of the invention in which an exclusive property or privilege is claimed are defined as follows:

1. A vehicle seat assembly comprising:

a base portion adapted to be secured to a supporting surface in fixed relationship with respect thereto;

a seat mounted on said base portion;

attachment means securing said seat to said base portion for fore and aft movement with respect thereto between an extreme rearward position and an extreme forward position in a path such that the seat tilts progressively forwardly as it moves forwardly from the extreme rearward position, said means including a fore and aft extending rail projecting upwardly from said base portion, a link pivotally connected between the seat portion of said seat and said rail, and means pivotally and slidably connecting the seat portion with said rail at a point spaced from said link;

means for locking said seat relative to said base portion in a selected position with respect thereto;

a pair of laterally spaced side members projecting forwardly from the forward edge of said seat;

a rod connected to said side members;

a leg rest member mounted on said side members for pivotal movement about a horizontal axis defined by the axis of said rod whereby the contour of said seat may be adjusted; and actuating means, attached to one of said side members, to cause rotation of said leg rest member about said rod and to prevent rotation in response to the application of pressure to said leg rest member, said actuating means comprises a pivot arm and an actuating shaft rotatably mounted on one of said side members whereby rotation of said actuating shaft causes rotation of said pivot arm to rotate said leg rest member and whereby pressure on said leg rest member does not cause rotation of said pivot arm.

2. A vehicle seat assembly as claimed in claim 1 wherein said seat includes unitary seat and back portions, and said movable section is mounted along the forward edge of said seat portion and defines an adjustable extension thereof.

3. A vehicle seat assembly as claimed in claim 1 wherein said movable section is pivotally mounted on said seat portion for selective adjustment about its pivotal axis with respect to said seat portion.

4. A vehicle seat assembly as claimed in claim 1 wherein said means pivotally and slidably connecting the seat portion with said rail includes an upwardly and forwardly curved slot in said rail, and a pin carried by said seat portion engaged with said slot.

5. A vehicle seat assembly as claimed in claim 4 wherein said means for locking said seat relative to said base portion comprises a locking plate mounted on one of said base portion and seat having a fore and aft extending series of slots formed therein, and a locking lever carried by the other of said base portion and seat engageable with a selected one of said slots to restrain the seat against movement with respect to the base portion.

* * * * *